3,356,779
METHOD OF CURING ARTICLES MANUFACTURED FROM CEMENT AND ASBESTOS
Herbert C. Schulze, 3690 Highland Drive,
Carlsbad, Calif. 92008
No Drawing. Filed June 4, 1965, Ser. No. 461,526
3 Claims. (Cl. 264—82)

This is a continuation-in-part of my copending patent application, Method of Curing Articles Manufactured From Cement and Asbestos, Ser. No. 318,530, filed Oct. 24, 1963.

This invention relates generally to articles manufactured from mixtures of Portland cement, asbestos fibers, silica, and water, and more particularly to a new and improved process for manufacturing articles from mixtures of the aforementioned materials.

It is customary in the manufacture of articles from mixtures of cement (hereinafter in this specification wherein the word cement is used, the reference is to the material particularly known as Portland cement) with asbestos and silica to mix the said cement, asbestos and silica with water and to form it after so being mixed into articles of manufacture such as pipe, pipe fittings, sheets of building siding, and numerous other articles. After mixing and during or after the forming operation, articles formed of these materials generally require a curing by the use of steam, water submersion or the like in order to achieve proper strength. Such processes are usually costly and frequently take a long period of time. Moreover, prior to curing these articles are sometimes soft and pliable and therefore easily damaged in handling.

It has previously been suggested to cure certain types of articles by using carbon dioxide under various and sundry means.

Heretofore, however, it has been necessary in using the carbon dioxide cure to make certain compromises either in process or in materials used. For example, Tada in U.S. Patent No. 1,932,150 uses a mixture of cement and asbestos, thereafter curing an obtaining a hard, dense calcium carbonate shell in carbon dioxide. It is obvious that this shell would be seriously adversely affected if subjected to steam (see the Chemistry of Cement and Concrete by Edward Arnold, published by Edward Arnold Publishers, Ltd. of London, England). For this reason, Tada discloses curing in the atmosphere. Normal curing time in the atmosphere is from seven to twenty-eight days.

Another use of carbon dioxide is disclosed in Wilkinson, U.S. Patent No. 2,877,499. However, Wilkinson forms his articles of a magnesium oxide or magnesium hydroxide rather than Portland cement. Wilkinson particularly mentions that he is using this rather than Portland cement for the purpose of achieving a carbonated magnesium compound in a carbon dioxide atmosphere; thereafter causing a hydration of the magnesium carbonate.

Another disclosure of curing a cement product with the addition of carbon dioxide is disclosed in Staley, U.S. Patent No. 2,496,895. Staley teaches the desirability of forming a special hard coating on a Portland cement and fiber mixture, and particularly points out the difficulties involved and essentially the impossibility of utilizing silica in any appreciable degree because of the chemical competition of the silica if present, for calcium hydroxide.

Thus, the prior art fails to disclose a satisfactory method of manufacturing articles of Portland cement, asbestos and containing substantial amounts of silica.

It is a major object of the present invention to provide a novel process for manufacturing articles of Portland cement, asbestos and silica mixed with water wherein the formed article is first exposed to carbon dioxide whereafter the article is subjected to steam. Exposure of the article's surfaces to carbon dioxide forms a layer of $CaCO_3$ interspersed with silica that defines a hard surface shell and gives the article an initial set. This initial set reduces the possibility of damaging the article during handling thereof prior to final curing. Exposure of the article to steam forms hydrated calcium silicates thereby resulting in a new and superior product.

It is another object of the present invention to provide a process of the aforedescribed nature that is quicker and more economical than heretofore proposed methods of this general type.

The foregoing and other objects and advantages of this invention will be clear to those skilled in the art upon reading the following specification.

Cement of the type generally known as Portland cement when mixed with asbestos fibers, and silica sand and water may be formed into articles such as pipe, siding, and the like. Some methods generally used in forming such articles are well known to those skilled in the art and in particular such articles may be formed by the method shown in U.S. Patent No. 2,182,353 issued December 5, 1939 or by other methods. The method disclosed in said Patent No. 2,182,353 utilizes sand or other finely divided silica in the dry proportions of about 0.3 to 1.0 part by weight to each 1 part of Portland cement and this mixture is mixed with asbestos fibers in the proportion of 15 to 60 parts by weight to 100 parts of total weight of asbestos and cement-silica, the total mixture being mixed with water. After mixing the mixture is formed into the desired shapes.

Under many methods of forming, the material formed is very soft and difficult to handle without damage. This is particularly true of some of the processes known in the art in using a "slurry" mixture. Prior to being cured, such articles sometimes may be damaged if handled too quickly after being formed. It is therefore desirable to give an initial set to the surfaces of the formed articles prior to subjecting them to extensive handling.

After being formed, I have discovered that the entire article while still in place upon its mold or upon removal therefrom, may be placed in a chamber and subjected to an atmosphere of carbon dioxide, containing at least 20% carbon dioxide. This may be accomplished easily and simply by using a chamber with an opening into which the articles may be positioned while still in place upon their forms, or after removal from their forms. Carbon dioxide may be introduced into the chamber by any suitable means, such as by connecting a source of such gas under pressure through a pipe or the like intercommunicating with the interior of said chamber.

In general, it is preferable that some of the air originally in the chamber be driven out by the carbon dioxide, although it is not necessary to have a completely air-free atmosphere. An atmosphere of a reasonable percentage such as 20% carbon dioxide will give results as hereinafter described, however, in general the higher the percentage of carbon dioxide in the chamber the better the results.

The article may be left within the carbon dioxide atmosphere for any given period of time and varying results will be obtained, which results should be checked for the particular use desired rather than adhering to one fixed formula for all articles. I have found that articles such as pipe of approximately ⅜ inch wall thickness and 4 inch diameter if left in the chamber for a period of about 15 minutes with a carbon dioxide atmosphere will result in a reasonable initial set and that the surfaces of the material will have definite strength and tightness. Such a short period of time is not necessarily a complete intermediate cure for these articles and longer times in carbon dioxide may be used.

Even low carbon dioxide pressures, for example, 10 pounds per square inch, will effect the initial cure. Higher pressures will cause more rapid reaction. Very good results may be obtained under a pressure of 30 pounds per square inch.

After being removed from the carbon dioxide atmosphere these articles are then placed in a steam autoclave and subjected to saturated steam under approximately 100 pounds per square inch pressure for several hours whereby the qualities of material are enhanced and changes, and certain chemical reactions take place resulting in complex combinations of calcium carbonates, calcium silicates and the like.

Although the aforementioned U.S. Patent No. 2,182,353 discloses a mixture utilizing 15 to 60 parts by weight of asbestos fibers to 100 parts of total weight of asbestos and cement-silica, I have discovered that other proportions may be utilized. By way of example, in my copending Patent Application Ser. No. 238,053 filed Nov. 15, 1962 and now Patent No. 3,204,019 issued Aug. 31, 1965, I disclose a mixture using 10% asbestos fibers by weight, 20% water by weight, 45% Portland cement by weight and 25% silica by weight. These percentages will work well in the application of the curing process herein mentioned, and other percentages of such materials may be used; asbestos from 5 to 30% of the dry mixture, silica flour 20 to 45% of the dry mixture, and Portland cement 25 to 50% of the dry mixture are all within reasonable limits depending upon the final results desired. It is important that at least 20% silica be used.

Water may be added as required for hydration, in which case the amount of water will be in the neighborhood of 15 to 30% of the wet mixture and much higher in slurries. All of the foregoing percentages relate to percentages by weight.

Although the embodiment of my invention specifically described in this application is fully capable of performing the objects and achieving the advantages desired, many modifications will be clear to those skilled in the art and it is not my intention to be limited by the exact embodiment disclosed in this application.

I claim:
1. The process of manufacturing an article from Portland cement, asbestos and silica, comprising:
   mixing Portland cement, asbestos and silica with water;
   pressure forming the resulting mixture into a shaped article;
   placing said shaped article in a chamber;
   introducing an atmosphere of carbon dioxide into said chamber;
   leaving said shaped article within said chamber until the surfaces of said article are given an initial set thereby reducing the danger of handling said article until it is further cured;
   removing said shaped and initially set article from said chamber;
   and thereafter placing said article in an autoclave and subjecting it to steam under pressure.

2. The process of manufacturing an article from Portland cement, asbestos and silica, comprising:
   mixing Portland cement, asbestos and silica, in dry proportions by weight of 15 to 60 percent asbestos and 40 to 85 percent silica and Portland cement in the relative proportions of .3 to 1 part of silica to 1 part of Portland cement, with water;
   pressure forming the resulting mixture into a shaped article;
   placing said shaped article in a chamber;
   introducing an atmosphere of at least 20 percent carbon dioxide into said chamber;
   leaving said shaped article within said chamber until the surfaces of said article are given an initial set thereby reducing the danger of handling said article until it is further cured;
   removing said shaped and initially set article from said chamber;
   and thereafter placing said article in an autoclave and subjecting it to steam under pressure.

3. The process of manufacturing an article from Portland cement, asbestos and silica, comprising:
   mixing Portland cement, asbestos and silica, in dry porportions by weight of 5 to 30 percent asbestos and 20 to 45 percent silica and 25 to 50 percent Portland cement with water;
   pressure forming the resulting mixture into a shaped article;
   placing said shaped article in a chamber with an atmosphere of at least 20 percent carbon dioxide in said chamber;
   leaving said shaped article within said chamber until the surfaces of said article are hardened thereby reducing the danger of handling said article until it is further cured;
   removing said shaped and initially hardened article from said chamber;
   placing said article in an autoclave and subjecting it to steam under pressure;
   and removing said article from said autoclave.

References Cited

UNITED STATES PATENTS

| 1,223,834 | 4/1917 | Sanger. | |
| 1,374,403 | 4/1921 | Smith. | |
| 1,932,150 | 10/1933 | Tada | 264—82 |
| 2,877,499 | 3/1959 | Wilkinson | 264—82 |

FOREIGN PATENTS 849,992   9/1960   Great Britain.

ROBERT F. WHITE, *Primary Examiner.*

ALFRED L. LEAVITT, ALEXANDER H. BRODMERKEL *Examiners.*

J. A. FINLAYSON, R. B. MOFFITT,
*Assistant Examiners.*